3,845,032
ALKYLBENZOATEAZOHYDROXYNAPHTH-
ARYLIDE DYESTUFFS
William H. Armento, Albany, N.Y., assignor to
GAF Corporation, New York, N.Y.
No Drawing. Filed Mar. 22, 1972, Ser. No. 237,090
Int. Cl. C09b 29/20; D06p 3/54
U.S. Cl. 260—204
6 Claims

ABSTRACT OF THE DISCLOSURE

Dyes for synthetic fibers and especially polyester fibers, which dyes have the following formula:

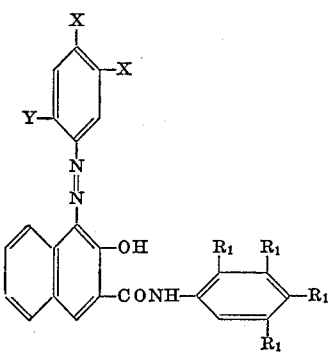

wherein one X is H and the other X is a radical of the formula —COOR, R being a $C_{2-8}$ alkyl radical, Y is H, $C_{1-2}$ alkyl, $C_{1-4}$ alkoxy, halo, $CF_3$ or CN, and $R_1$ is independently H, $C_{1-2}$ alkyl or $C_{1-4}$ alkoxy, e.g. methoxy, ethoxy, propoxy and butoxy, but wherein not more than two of the $R_1$ substituents are alkyl or alkoxy, with the remaining $R_1$ substituents being H. When applied to polyester fibers, these dyes have exceptional fastness to light, good build-up and a high stability against sublimation.

BACKGROUND OF THE INVENTION

Field of the Invention

This invention relates to the dyeing of synthetic fibers and especially polyester fibers and more particularly to novel azo dyes which dye synthetic fibers with exceptional results.

DESCRIPTION OF THE PRIOR ART

There has been considerable effort in the dyestuffs industry to find suitable dyes for coloring synthetic fibers and especially polyester fibers. By the expression "polyester fibers" is meant those fibers which are obtained by the polycondensation of diacids with dialcohols, and in particular those obtained by the poly-condensation of terephthalic acid with ethylene glycol. Such fibers are available commercially under trademarks such as "Dacron," "Teregal," "Terylene," etc. In the past, polyesters have been dyed with water-insoluble dispersed dyes by carrier dyeing or pressure dyeing and by thermofixation methods such as the thermosol process.

In carrying out the "Thermosol" process in particular, fastness to sublimation is a very important feature. In this process, polyester fabric or a mixed polyester-cotton fabric is padded with disperse dye, dried, and then subjected to temperatures of 360–425° F. for 30–90 seconds. For mixed fabrics, the lower ranges of temperature and heating time may be used, e.g., 360–390° F. for about 30 seconds. Because the dyestuff is exposed to such high temperatures, it is essential that the dyestuff possess excellent fastness to sublimation in order to minimize pollution of the atmosphere and equipment with the sublimed dyestuff.

It is also known to dye polyester fibers by means of the so-called "plastosoluble" dyestuffs, which are used for dyeing cellulose acetate fibers. These dyes can be applied either at ordinary pressure in the presence of carriers, the most common of which are o-phenylphenol and the chlorinated derivatives of benzene, or under superatmospheric pressure and consequently in the absence of carrier and in a shorter time. The shades obtained are generally rather bright; in many cases, however, they lack fastness, especially to light, to wet tests and to sublimation.

It is further known that it is possible to dye polyester fibers under the conditions used for the so-called "plastosoluble" dyestuffs, by means of mixtures of diazotizable bases and coupling compounds belong to the series of arylides of β-hydroxynaphthoic acid. The corresponding pigments are formed on the fiber by simultaneous diazotization and coupling. Provided that the choice of base and arylide and the relation between the amounts of these substances fixed on the fiber are correct, the colors obtained are capable of satisfying to a high degree the requirements so far as fastness to light and wet tests are concerned. Although from the absolute point of view the resistance to sublimation is satisfactory, in numerous cases, however, variations in shades which can be considerable are observed at the time of performing. In addition, this method of dyeing has the disadvantage of being lengthy since two successive treatments of the fiber are necessary.

As indicated, various types of azo dyes have been used heretofore for dyeing polyester fibers. Such dyes are described for example in U.S. Pat. No. 3,043,647. In addition, azo dyes related to those described herein have been described for use in other areas such as U.S. Pats. Nos. 3,511,829, 2,736,724, 3,288,776 and 3,297,677. Of the above patents, No. 3,511,829 relates to phenylazoaminonaphthol dyes wherein the diazo moiety has the structure

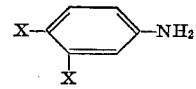

wherein one X is hydrogen with the other being —COOR where R is alkyl. The coupler moiety, however, is sulfo-containing, thus imparting solubility in water. The dyestuffs are nylon and wool dyes. Also, U.S. Pat. No. 3,-043,647 relates to azoic dyes with the diazo moiety being a benzene amine, and the coupler moiety being 3-hydroxy-2-naphth-o-anisidide or o-phenetidide. These dyestuffs are claimed as dyestuffs for polyester fibers. However, none of these prior patents describe the novel azo dyes of the present invention or their use for coloring polyester fibers with outstanding results.

SUMMARY OF THE INVENTION

It is accordingly one object of the invention to provide a new class of dyestuffs for polyester fibers.

A further object of the invention is to provide novel methods for dyeing polyester fibers using the dyes of the present invention.

Other objects and advantages will become apparent as the description thereof proceeds.

In satisfaction of the foregoing objects and advantages there is provided a new class of dyestuffs useful for dyeing polyester fibers, which dyestuffs are of the formula:

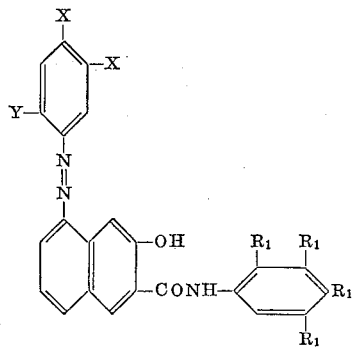

wherein one X is H and the other X is a radical of the formula —COOR wherein R is a $C_{2-4}$ alkyl radical, e.g. ethyl, isopropyl, isooctyl, Y is H, $C_{1-2}$ alkyl (methyl, ethyl), $C_{1-4}$ alkoxy, halo (Cl, Br, etc.), $CF_3$ or CN, and $R_1$ is independently H, $C_{1-2}$ alkyl or $C_{1-4}$ alkoxy, e.g. methoxy, ethoxy, propoxy and butoxy but wherein not more than 2 of the $R_1$ substituents are alkyl or alkoxy, with the remaining $R_1$ substituents being H. Also provided are methods for coloring polyester fibers which comprise forming aqueous dispersion of said dyestuffs and applying to said fibers.

DESCRIPTION OF PREFERRED EMBODIMENTS

As pointed out, the present invention relates to novel azo dyestuffs which are useful for coloring synthetic fibers and especially polyester fibers. The novel dyes of this invention have exceptionally good fastness to light, excellent build-up and a high stability against sublimation when employed as dyes for polyester fibers. These dyes color polyester fibers a scarlet color.

The dyestuffs of this invention are produced in a generally conventional manner. Thus in the first step, an alkyl meta- or para-aminobenzoate of the formula:

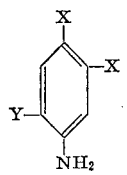

wherein X and Y are as above, is initially diazotized and then coupled with a hydroxynaphtharylide solution at a temperature of about 0–20° C. Diazotization in the first step may be carried out in the conventional manner by reacting the amine with nitrosyl sulfuric acid at 0–30° C. or with sodium nitrite at 0–20° C. in an aqueous acidic solution of a mineral acid, usually hydrochloric acid. The excess nitrite may be later removed by treatment with sulfamic acid. The resulting diazo is then coupled with an hydroxynaphtharylide of the formula:

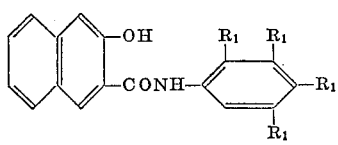

wherein $R_1$ is as described above.

The hydroxynaphtharylide solution is obtained by dissolving the compound in an aqueous-caustic soda solution. After coupling is completed, the precipitated dyestuff is filtered and washed. It is then dispersed with the usual dispersing agents, either as the wet press cake, or in dried form. The dispersed dyestuff is then in suitable form to form an aqueous dispersion which is suitable for dyeing the synthetic fibers, particularly polyester fibers.

Suitable diazo components which may be employed in accordance with the present invention comprise the following compounds:

butyl m-aminobenzoate
butyl p-aminobenzoate
ethyl-p-aminobenzoate
ethyl-m-aminobenzoate
isobutyl p-aminobenzoate
tert-butyl p-aminobenzoate
amyl p-aminobenzoate
hexyl p-aminobenzoate
octyl m-aminobenzoate
(2-ethyl-1-hexyl) p-aminobenzoate
butyl 3-methyl-4-aminobenzoate
ethyl 3-ethoxy-4-aminobenzoate
t-butyl 3-chloro-4-aminobenzoate
hexyl 3-cyano-4-aminobenzoate
amyl 3-$CF_3$-4-aminobenzoate
ethyl 4-methyl-3-aminobenzoate
heptyl 4-methoxy-3-aminobenzoate
propyl 4-bromo-3-aminobenzoate
isooctyl 4-CU-3-aminobenzoate
butyl 4-$CF_3$-3-aminobenzoate Suitable coupling components which may be employed in accordance with the present invention comprise the following compounds:

3-hydroxy-2-naphthanilide
3-hydroxy-2′,5′-dimethoxy-2-naphthanilide
3-hydroxy-2-naphth-o-toluidine
3-hydroxy-5′-methyl-2-naphth-o-anisidide
3-hydroxy-2′-methyl-2-naphth-p-anisidide
3-hydroxy-2-naphth-m-toluidide
3-hydroxy-2-naphth-p-toluidide
3-hydroxy-2-naphth-2,4-xylidide
3-hydroxy-2-naphth-3,5-xylidide
3-hydroxy-2-naphth-o-anisidide
3-hydroxy-2-naphth-p-anisidide
3-hydroxy-2-naphth-o-phenetidide
3-hydroxy-2′-propoxy-2-naphthanilide
3-hydroxy-2′-butoxy-2-naphthanilide As pointed out, the products of the invention are useful for dyeing synthetic fibers and especially polyester fibers. The dyestuffs can be applied to these fibers at a high temperature by any of the known processes already used for the coloration of such fibers by means of other pigments. Dyeing can be carried out, for example, under superatmospheric pressure and at temperatures above 50° C., preferably at temperatures between 50° C. and 150° C., by means of aqueous dispersions of the dyestuffs. Fabrics based on polyester fibers can also be printed by means of pastes containing aqueous dispersions of the said dyestuffs and then the printed fibers subjected to steaming under superatmospheric pressure.

Alkylarylsulphonates and the products resulting from the condensation of sulphonated aromatic derivatives with aldehydes, such as the methylene-dinaphylsulphonates, are particularly valuable auxiliary substances since they allow the preparation of a good dispersion of the dyestuffs and facilitate the taking up of the latter on the polyester fibers. On the other hand, "carriers," such as mono- or poly-chlorinated derivatives of the benzene series or diphenyl, can be added to the dye bath or to the printing pastes. These substances exert a swelling action on the polyester fibers and are capable of improving the tinctorial yield. In addition, it is useful, and particularly so in the case of dyeing on bobbins, to add to the dye bath anti-static agents such as the products of condensation of compounds containing an active hydrogen with ethylene oxide and quaternary ammonium salts containing a fatty chain. This addition allows lack of uniformity to be remedied which in all probability is due to the accumulation of electrical charges as a result of the circulation of the bath around hydrophobic fibers.

The following examples are presented to illustrate specific embodiments of the invention but it is not to be considered as limited thereto. In the examples, parts are by weight unless otherwise indicated.

EXAMPLE 1

Preparation of the dyestuff having the formula:

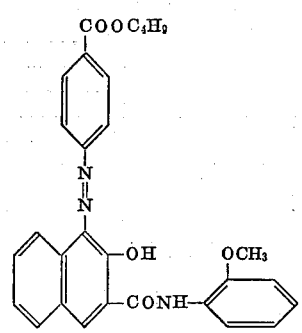

In this example, 20 grams of the butyl ester of p-aminobenzoic acid and 20 ml. of hydrochloric acid (20° Bé.) are combined with 130 ml. of water and stirred to solution. This is then added to 100 ml. of water and 19 ml. of sodium nitrite solution, (31.5%), iced to 0° C. plus a large excess of ice and 25 ml. of hydrochloric acid. This mixture is stirred for 30 minutes to prepare the diazo.

To prepare the coupler solution, 32 grams of 3-hydroxy-2-naphth-o-anisidide are added to 200 ml. of water, heated to 75° C. and then 15 ml. sodium hydroxide solution (40%) is added. It is stirred to solution, treated with a solution of 2.0 grams of Emulphor ON–830 (polyethoxylated fatty alcohol, GAF Corporation) and then iced to 40° C.

To the diazo solution is then added 22 grams of sodium acetate crystals to Congo negative, and then the coupler solution is run in at 5–10° C. over 30 minutes. It is stirred for 2 hours while warming to 20° C., filtered and washed with 1½ liters of warm water plus 10 ml. of sodium hydroxide to remove excess coupler. The press cake weighs 301 grams (estimated 48 grams of dry dyestuff).

The paste is dispersed by mixing the press cake with 22 grams of Reax–85A (ligninsulfonate), 22 grams of Marasperse N–22 (sodium ligninsulfonate), 1.5 grams of Monopole Oil and 1.0 grams of Nekal WS–25 (sulfonated aliphatic polyester). After stirring for 1 hour, it is Viking milled for 65 hours.

A 2.0% dyeing on the weight of the fiber is made on polyester by the thermosol process as follows: a padding liquor is prepared at a concentration of 16 oz./gal. with the addition of 4.0 oz./gal. of a sodium alginate thickener and 0.2 oz./gal. of a sodium salt of sulfated nonylphenoxy poly(ethyleneoxy)ethanol. Polyester fiber and polyester-cotton fabric are padded with this liquor at 60° C., dried, and submitted to hot air at 220° C. for 90 seconds. Both swatches are a deep scarlet shade, the cotton remaining undyed. There is no sublimation during the thermosoling to soil equipment and pollute the atmosphere, wash and light fastness are excellent.

Dyeings made by carrier dyeing, employing o-chlorophenol as carrier are equally good.

EXAMPLE 2

In the same manner as Example 1, 20 grams of the butylester of m-aminobenzoic acid are diazotized and coupled with 33.7 grams of 3-hydroxy-5'-methyl-2-naphth-o-anisidide to produce a dyestuff which has the formula:

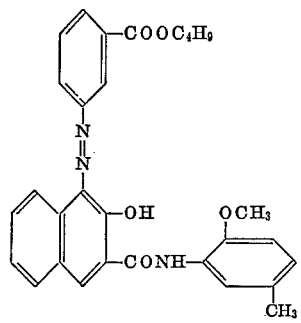

After dispersion in the manner of Example 1 an excellent scarlet dyeing is obtained when polyester fiber is dyed according to the thermosol method of dyeing.

EXAMPLE 3

In the same manner as Example 1, 24 grams of the 2-ethylhexyl ester of p-aminobenzoic acid are diazotized and coupled with 32 grams of 3-hydroxy-2-naphth-o-anisidide to produce a dyestuff which has the formula:

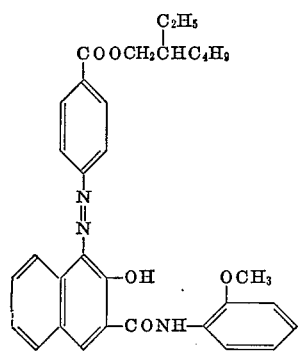

When dispersed as in Example 1, and employed to dye polyester fibers according to the thermosol method, an excellent scarlet dyeing is obtained.

EXAMPLES 4 TO 7

In the manner of Example 1, the following dyestuffs are produced and employed to dye polyester fibers with the results indicated:

| No. | Diazo base | Coupler | Color |
| --- | --- | --- | --- |
| 4 | m-Aminobenzoic acid, hexyl ester. | 3-hydroxy-2-naphth-o-anisidide. | Scarlet. |
| 5 | p-Aminobenzoic acid, butyl ester. | 3-hydroxy-2-naphth-anilide. | Do. |
| 6 | do | 3-hydroxy-2-naphth-o-phenetidide. | Red. |
| 7 | do | 3-hydroxy-2-naphth-o-toluidide. | Scarlet. |
| 8 | 3-methyl-4-aminobenzoic acid, butyl ester. | do | Do. |
| 9 | 4-methyl-3-aminobenzoic acid, hexyl ester. | do | Do. |

This invention has been disclosed with respect to certain preferred embodiments, and it will be understood that modifications and variations thereof will become obvious to persons skilled in the art and are intended to be included within the spirit and purview of this application and the scope of the appended claims.

What is claimed is:

1. A compound of the following formula:

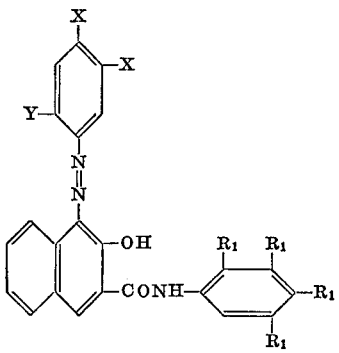

wherein one X is H and the other X is —COOR wherein R is $C_{2-8}$ alkyl, Y is H or $C_{1-2}$ alkyl, and $R_1$ is independently H, $C_{1-2}$ alkyl or $C_{1-4}$ alkoxy but wherein not more than two $R_1$'s are alkyl or alkoxy.

2. A compound according to claim 1 wherein the X para to the azo bridge is $COOC_4H_9$, the $R_1$ in 2-position relative to the amido link is $OCH_3$, and the remaining $R_1$'s are H.

3. A compound according to claim 1 wherein the X meta to the azo bridge is $COOC_4H_9$, the $R_1$ in 2-position relative to the amido link is $OCH_3$, the $R_1$ in 5-position is $CH_3$, and the remaining $R_1$'s are H.

4. A compound according to claim 1 wherein the X para to the azo bridge is

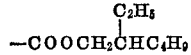

the $R_1$ in 2-position relative to the amido link is $OCH_3$, and the remaining $R_1$'s are H.

5. A compound according to claim 1 wherein Y is H.

6. A compound according to claim 1 wherein Y is methyl.

References Cited

UNITED STATES PATENTS

| | | | |
|---|---|---|---|
| 1,684,275 | 9/1928 | Hoffa et al. | 260—204 |
| 1,914,427 | 6/1933 | Heyna | 260—204 |
| 2,019,914 | 11/1935 | Kracker | 260—204 |
| 2,040,473 | 5/1936 | Etzelmiller | 260—204 |
| 2,416,248 | 2/1947 | Woodward | 260—151 |

FOREIGN PATENTS

| | | | |
|---|---|---|---|
| 866,781 | 5/1961 | Great Britain | 260—204 |

FLOYD D. HIGEL, Primary Examiner

U.S. Cl. X.R.

260—417 R, 559 R